US 6,675,668 B2

(12) United States Patent
Schamscha

(10) Patent No.: US 6,675,668 B2
(45) Date of Patent: Jan. 13, 2004

(54) DOUBLE CLUTCH TRANSMISSION AND METHOD FOR CONTROLLING AN AUTOMATED DOUBLE CLUTCH TRANSMISSION

(75) Inventor: Axel Schamscha, Leiferde (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/127,403

(22) Filed: Apr. 22, 2002

(65) Prior Publication Data

US 2002/0189383 A1 Dec. 19, 2002

Related U.S. Application Data

(63) Continuation of application No. PCT/EP00/09068, filed on Sep. 15, 2000.

(30) Foreign Application Priority Data

Oct. 21, 1999 (DE) ......................... 199 50 696

(51) Int. Cl.$^7$ ............................. F16H 59/00; F16H 3/38
(52) U.S. Cl. ...................................................... 74/340
(58) Field of Search ................... 74/339, 340, 325, 74/329, 333, 334, 335, 413

(56) References Cited

U.S. PATENT DOCUMENTS

| 5,030,179 | A | * | 7/1991 | Ganoung | 74/333 X |
| 5,392,665 | A | * | 2/1995 | Muller | 74/330 |
| 5,603,242 | A | * | 2/1997 | Krieger | 74/335 |
| 5,711,409 | A | * | 1/1998 | Murata | 74/336 R |
| 6,021,880 | A | * | 2/2000 | Reed, Jr. et al. | 74/335 X |
| 6,506,139 | B2 | * | 1/2003 | Hirt et al. | 477/3 |

FOREIGN PATENT DOCUMENTS

| DE | 82144176 | 5/1982 |
| DE | 3414107 | 4/1984 |
| DE | 3546454 | 8/1985 |
| DE | 4316784 | 5/1993 |
| DE | 4322523 | 7/1993 |
| DE | 4330170 | 9/1993 |
| DE | 19625019 | 6/1996 |
| DE | 19800431 | 1/1998 |
| DE | 19800880 | 1/1998 |
| DE | 19950696 | 9/2000 |
| EP | WO8100292 | 7/1980 |
| EP | 0691486 | 6/1995 |
| WO | WO0020243 | 9/1999 |

* cited by examiner

*Primary Examiner*—Roger Pang
(74) *Attorney, Agent, or Firm*—Baker Botts LLP

(57) ABSTRACT

A double clutch transmission is provided for a motor vehicle. The transmission is equipped with a first transmission input shaft which is connected to a starting gear and which is connected to a first clutch, a second transmission input shaft which is connected to at least two driving gears and which is connected to a second clutch, and a shared transmission output shaft. Two of the gears that are connected to the second transmission input shaft can be simultaneously shifted in a parking position function. A method is provided for controlling an automated double clutch transmission during which an activation of a parking position is effected by simultaneously engaging two gears which are assigned to a transmission input shaft that does not have any starting gear.

15 Claims, 1 Drawing Sheet

DOUBLE CLUTCH TRANSMISSION AND METHOD FOR CONTROLLING AN AUTOMATED DOUBLE CLUTCH TRANSMISSION

This application is a continuation of PCT/EP00/09068, filed Sep. 15, 2000.

BACKGROUND OF THE INVENTION

The invention relates to a double clutch transmission and a method for controlling an automated double clutch transmission.

Double clutch transmissions have long been known and are used by preference in motor vehicles. In general, a double clutch transmission has a first transmission input shaft, connected to a first clutch and speed change gears for a first group of gear speeds, a second transmission input shaft connected to a second clutch and speed change gears for a second group of gear speeds, and a shared transmission output shaft. Usually, the first group of gears comprises the odd-numbered forward gears and the reverse gear, while the second group of gears comprises the even-numbered forward gears. In a double clutch transmission of this nature, a shifting operation, which is to say a change from an active gear to the next higher or next lower destination gear, consists of an initial engagement of the destination gear, which can, for example, be accomplished via a suitable gear change sleeve and a synchromesh mechanism associated with the destination gear, and a subsequent overlapping disengagement of the clutch associated with the transmission input shaft for the active gear and engagement of the clutch associated with transmission input shaft for the destination gear, wherein an interruption of tractive power can largely be avoided. Aside from the shifting operations, the transmission of power is accomplished by means of the first and second transmission input shafts in alternation.

Variations and further refinements of the double clutch transmission have been developed to fit specific application requirements and to implement additional functions.

Thus, for example, DE 3,546,454 A1 discloses a double clutch transmission in which the two transmission input shafts can be connected through an additional clutch. In this way, both clutches can be engaged, particularly for a startup process, which makes it possible to increase the available clutch capacity and reduce the thermal load on the clutches. No other use may be made of the additional clutch, for example for a parking lock.

The class-defining patent DE 4,316,784 A1 describes a double clutch transmission that is designed for an electrically driven vehicle and has only two gears.

The speed change gears for the two gear speeds are each rigidly connected to one of the transmission input shafts and the shared transmission output shaft. A gear change is thus accomplished solely by means of the two associated clutches. To implement a parking lock and a so-called hill holder, both clutches are designed so as to be capable of simultaneous engagement. However, a parking lock of this design cannot be used with the double clutch transmissions that are customary in motor vehicles and that have actively engaging clutches and multiple gears for each transmission input shaft.

Also known in the state of the art is a double clutch transmission (EP 0,691,486 A1) that has two transmission input shafts, wherein a multiplicity of gears are associated with one of the transmission input shafts. In a certain shifting state of this double clutch transmission, only the engine prevents the vehicle wheels from turning, which cannot be called a "real parking lock."

Additionally known from the state of the art is a transmission with a transmission input shaft (DE 198 00 880 A1) that has a shifter, wherein two gears are engaged simultaneously to produce a parking lock. However, releasing the parking lock when there is a relatively large load on the simultaneously engaged gears presents a problem in this transmission.

The object of the invention is to further develop this class of double clutch transmission for use in a motor vehicle equipped with an internal combustion engine, providing a simple and cost-effective parking lock and to specify a suitable method for controlling an automated double clutch transmission in accordance with the invention.

SUMMARY OF THE INVENTION

The double clutch transmission intended particularly for use in a motor vehicle is equipped with a first transmission input shaft that has a starting gear and is connected to a first clutch, and with a second transmission input shaft that has a driving gear and is connected to a second clutch, and with a shared transmission output shaft. A plurality of gear speeds are associated with at least one of the two transmission input shafts.

In order to implement a parking lock function, in accordance with the invention two of the gears associated with one of the two transmission input shafts are designed to be capable of being engaged simultaneously.

A quite high number of gears makes it possible to adapt the double clutch transmission to the specific characteristics of an internal combustion engine serving as a drive motor whose usable operating range lies within a limited speed range. By means of a simultaneous engagement of two gears associated with one of the transmission input shafts, which is to say an engagement of associated clutches, the transmission output shaft connected to the drive wheels of the motor vehicle is locked by corresponding speed change gears of the engaged gears and the transmission input shaft connected with them, which makes it possible to reliably prevent the motor vehicle from rolling. Thus, without significant additional effort an effective parking lock is implement that is preferably applied by using actively engaged clutches that are disengaged in the quiescent state. This makes it possible to dispense with a separate parking lock, which frequently is designed in the form of a dog clutch lock located on the transmission output shaft.

In the double clutch transmission, the first transmission input shaft can have all starting gears, and the two simultaneously shiftable gears can be associated with the second transmission input shaft. Such an arrangement makes it significantly easier, or may even be necessary to make it possible, to release the parking lock when the gears that are engaged simultaneously as the parking lock are under great load. For instance, if the motor vehicle is parked on a downhill grade using the parking lock, a coasting torque resulting from the downhill component of the vehicle weight is applied to the transmission output shaft through the drive wheels and other components of the drive train. As a result of the different gear ratios of the gears engaged in the parking lock function, and an input-side connection via the shared transmission input shaft, the speed change gears of the lower gear speed are loaded in the coasting direction and the speed change gears of the higher gear speed are loaded in the direction of powered operation. In this way, the torques acting at the associated clutches can be so large that the gears can be disengaged only with unacceptably large actuating forces or cannot be disengaged at all. Thus, it is advantageous for a startup process if a torque opposite to the direction of the load can first be applied to the transmission output shaft via a gear of the other transmission input shaft, which the present invention makes possible. During this process, the gear in question is first engaged and the associated first clutch is engaged. As a result, an increasing torque acts through the transmission output shaft and relieves the load on at least one of the clutches of the two engaged gears acting as the parking lock so that it can be released with a relatively small actuating force. This then also relieves the load on the other clutch so that it too can be disengaged largely without force, with the result that the parking lock is then fully released. In the example described of the motor vehicle parked on a downgrade, the reverse gear is the appropriate gear for compensation of the load. In the case of a motor vehicle parked on an upgrade, the direction of load is reversed, so in this case a forward gear, for example the first gear, is suitable for compensation of the weight-related load. Because they each have a fairly high available torque while simultaneously having a low starting speed, it is preferable to use the starting gears, i.e. first gear and reverse gear, for compensating loads.

The two simultaneously shiftable gears can be engaged manually. To perform the shifting, it is then useful to provide a separate shifting element, for example a parking shift lever. Engagement of the parking lock can be selected by the driver by means of the shifting element and transmitted to the associated clutches of the two gears in question by a transmission mechanism. The advantage of a manual or mechanical shifting of the gears resides in low susceptibility to problems and the possibility for the driver to directly influence the parking lock. In the event that simultaneous shifting of the two gears is not possible, for example because pawls of at least one of the two clutches in question do not align, the driver can allow the motor vehicle to roll a short distance until the two gears can easily be engaged.

However, the two simultaneously shiftable gears can also be engaged automatically, and a parking position of a shift lever or a separate shifting element can be provided to initiate the shifting. Automated shifting of gears, which generally is performed by means of a control unit and actuators that can be controlled thereby, is widely used in double clutch transmissions. It is thus possible to implement a parking lock with little effort, in other words without an additional mechanism, if the two gears in question can be shifted simultaneously by automatic means. Initiation of shifting can take place in a parking position of the associated shift lever in a manner analogous to shift gates of automatic transmissions. In the event that such a parking position is not provided, the shifting process can also take place by means of a special shifting element which can for example be implemented as an additional parking shift lever, a rocker switch or some other form.

The two simultaneously shiftable gears can be adjacent gears. In the customary arrangement of gears, this would be the combination of second/fourth gear or fourth/sixth gear. When adjacent gears are used, the loading of the gears and thus that of the relevant clutches is lower than when the combination of second and sixth gear is used on account of the smaller difference in gear ratios when engaged. Hence, the parking lock can be engaged and disengaged more easily.

The two simultaneously shiftable gears can be predetermined, in which case it is advantageous to use the largest adjacent gears. Particularly in the case of manual or mechanical operation of the parking lock, predetermination of the two gears to be simultaneously engaged is advantageous in order to simplify the mechanics. It is then usually preferred to use the two largest adjacent gears, since the gear ratio difference is the smallest here, and hence shifting capability is best.

In the case of automated shifting of the gears intended for the parking lock function, it is advantageous if the two simultaneously shiftable gears are variably selectable to a large degree. In the case of a six-speed transmission with three gears per transmission shaft, there are three possible combinations of gears for the relevant transmission input shaft to implement the parking lock function. If, for example, a certain combination of gears is specified with highest priority, but one of the two gears temporarily cannot be shifted or would require an unacceptably high actuating force to shift, for instance because of unfavorable pawl alignment of the associated clutch, then instead the gear not initially intended can be shifted.

In addition, sensors can be provided for determining load magnitude and/or for determining a load direction of the simultaneously shiftable gears. Especially in the case of automated shifting of the gears in question, it is advantageous for a startup process to first establish the load magnitude. If it is small enough, the parking lock can be released immediately without taking further precautions. However, if it is relatively large, determination of the direction of load identifies a gear of the first transmission input shaft that can be used to compensate the load before the parking lock can be released.

A safety lock can be provided to prevent the two simultaneously shiftable gears from being engaged when the motor vehicle is moving. This safety lock can be designed to release when the vehicle is stationary so that the parking lock can be engaged only when the vehicle is stationary. In the case of automated actuation of the two gears used for the parking lock function, the safety lock can consist of a suitable safety query in a control program of an associated electronic control device, for example, which makes it possible to prevent engagement of the two gears intended for the parking lock function as long as motion of the motor vehicle in question is detected by a motion detector, which is evaluated in the safety query. The motion sensor can be designed as a rotation sensor, for example, and be arranged on the transmission output shaft. In the case of manual or mechanical actuation of the parking lock, the safety lock could take the form of a spring-loaded locking pin equipped with a solenoid by means of which the relevant transmission mechanism or the actuating element can be locked by the spring in an inoperative position in which the parking lock is released, and can be enabled by means of the solenoid when the vehicle is stationary to permit engagement.

The method for controlling an automated double clutch transmission provides that in a parking lock function, an activation of a parking lock is accomplished through simultaneous engagement of two gears of a transmission input shaft that has no starting gear. As a result of the fact that the starting gears are associated with the other transmission input shaft, it is possible to compensate loads that may result from the weight of the vehicle when it is parked on downgrades and upgrades so as to achieve largely force-free release of the parking lock.

In order to avoid activation of the parking lock while the vehicle is moving, it can first be determined whether the vehicle is moving or stationary. When the vehicle is moving, activation of the parking lock is prevented; in contrast, when the vehicle is stationary, activation is permitted and can subsequently be performed.

For deactivation of the parking lock, the magnitude of the load on the simultaneously engaged gears can first be determined. If a relatively small load is present, the engagement of the gears in question can be released largely free of force so that no further preparations are necessary to release the parking lock.

However, when a relatively large load is present, it is advantageous to determine the direction of the load, and subsequently to engage a starting gear in a direction opposite to the direction of loading, and to engage an associated clutch until the load is adequately small, whereupon the engagement of the gears can be released in a largely force-free manner.

The double clutch transmission and the corresponding method in accordance with the invention are explained in detail below.

DESCRIPTION OF THE INVENTION

Figure 1:
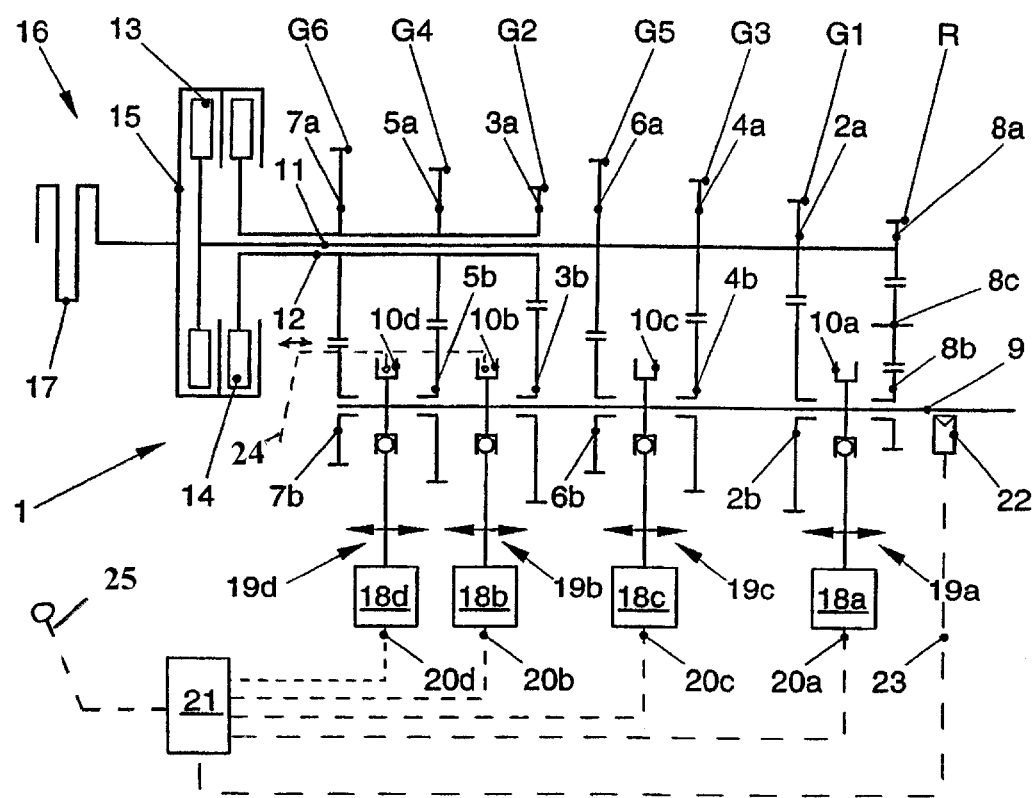
FIG. 1 is a schematic diagram of a double clutch transmission according to an embodiment of the invention.

FIG. 1 schematically represents a double clutch transmission 1 which has six forward gears G1–G6 and one reverse gear R. Associated with each of the forward gears G1–G6 is a gear pair consisting of a driving gear 2a–7a and a driven gear 2b–7b. In contrast, the reverse gear R has an intermediate gear 8c for reversal of direction in addition to a driving gear 8a and a driven gear 8b. Each of the driven gears 2b–8b is mounted rotatably on a transmission output shaft 9 and can be connected thereto in a nonrotating manner via associated shifters and synchromesh mechanisms 10a–10d in order to shift the gears G1–G6 and R. The shifters and synchromesh mechanisms 10a, 10c and 10d may be designed to act on both sides, to alternatively shift one of two gears, for example in the case of the shifter and synchromesh mechanism 10c the third or fifth gear G3, G5. In contrast, the shifter and synchromesh mechanism 10b is designed to act on only side; in other words only the second gear G2 can be shifted thereby. On the input side, each of the driving gears 2a–8a is rigidly connected to one of two coaxially arranged transmission input shafts 11 and 12. The odd-numbered gears G1, G3 and G5 and the reverse gear R are associated with the first, centrally located transmission input shaft 11, whereas the even-numbered gears G2, G4 and G6 are associated with the second transmission input shaft 12, which is designed as a hollow shaft. Each of the two transmission input shafts 11, 12 is connected to a separate clutch 13 or 14, by which means they can be connected to or disconnected from a drive motor 16, symbolized in the figure by a crankshaft 17, via a shared clutch cage 15. During normal driving operation, one of the gears G1–G6 is engaged, and the clutch 13 or 14 that is connected to the corresponding transmission input shaft 11 or 12 associated with the relevant gear is engaged. During a shifting process, first a destination gear, which is associated with the other, disengaged clutch 14 or 13, is engaged. A transition from the engaged active gear to the destination gear is then accomplished by simultaneously disengaging the clutch of the active gear and engaging the clutch of the destination gear. Accordingly, the power flow of the transmission between shifting operations passes to the transmission output shaft 9 alternately through either the first clutch 13, the first transmission input shaft 11 and gears of one of the gear speeds G1, G3, G5, R that is associated therewith, or through the second clutch 14, the second transmission input shaft 12, and gears of one of the gear speeds G2, G4, G6 that is associated therewith.

In the illustrated embodiment, the double clutch transmission 1 is of automated design. To this end, one shifting actuator 18a–18d is associated with each of the shifters and synchromesh mechanisms 10a–10d. The shifters and synchromesh mechanisms 10a–10d are connected in a positive or non-positive manner to the shifting actuators 18a–18d and can be moved and or subjected to actuating forces thereby to engage or disengage the gears, as indicated by bidirectional arrows 19a–19d. The shifting actuators 18a–18d are connected to a shifting control device 21 through associated control lines 20a–20d and can be actuated by said shifting control device. In order to detect motion of the vehicle, a rotation sensor 22 is located on the transmission output shaft 9 and is connected to the shifting control device 21 via a control line 23. A shift lever 25 may be coupled to the shifting control device 21.

While only one of the gears G1–G6; R can be engaged in a standard function, i.e. in normal operation, by an appropriate control program of the shifting control device 21, in a parking lock function, i.e. to produce a parking lock, two gears of the second transmission input shaft 12, which has no starting gears G1 and R, can be engaged simultaneously; in this example, these two gears are preferably the second and fourth gears G2, G4 on account of the arrangement and association of the shifters and synchromesh mechanisms 10b, 10d. It is thus possible to dispense with a separate parking lock arrangement, which in particular is required when actively engaged clutches 13, 14 are used. The use of gears on the second transmission input shaft 12 that has no starting gears G1, R makes possible or significantly facilitates release of the parking lock when a relatively large load is present, since a torque approximately equal to and in the opposite direction from the load can be applied to the transmission output shaft 9 by engaging the first clutch 13 when a gear associated with the first transmission input shaft 11 and opposing the direction of the load is engaged, relieving the load on at least one of the shifters and synchromesh mechanisms 10b, 10d of the gears G2; G4 which act as the parking lock and permitting them to be disengaged with relatively low actuating force. The load on the other shifter and synchromesh mechanism is then also relieved thereby so that this too can be disengaged in a largely force-free manner, which then fully releases the parking lock. In a safety function to protect the relevant shifters and synchromesh mechanisms 10b, 10d and to improve shifting convenience, an evaluation of one of the signals provided by the rotation sensor 22 can determine whether the vehicle is stationary or moving prior to engagement of the parking lock. By means of the control program, the engagement of the parking lock can be triggered by an appropriate command from the driver in the event that the vehicle is stationary, and can be suppressed in the event that the vehicle is moving.

The engagement of gears for the parking lock function can be achieved by providing appropriate signals from the transmission controller 21 to the shifting actuator 18 in the case of an automatic transmission. Alternately, in either a manual or automatic transmission a separate shift control lever 24, shown dotted in FIG. 1, may be provided to manually move two gears into engagement.

While there have been described what are believed to be the preferred embodiments of the invention those skilled in the art will recognize that other changes and modifications may be made thereto without departing from the spirit of the invention, and it is intended to claim all such changes and modifications as fall within the true scope of the invention.

I claim:

1. In a double clutch transmission having a first transmission input shaft connected to at least one starting gear and connected to the output of a first clutch and a second input transmission shaft connected to at least two driving gears and connected to the output of a second clutch, said transmission having a shared transmission output shaft, the improvement wherein two gears associated with the second input shaft are arranged to be simultaneously engaged as a parking lock function and wherein said first input shaft is connected to all starting gears.

2. The improvement specified in claim 1, wherein said two gears are arranged to be manually engaged, and wherein a separate shift control is provided to engage said two gears.

3. The improvement specified in claim 1, wherein said two gears are arranged to be engaged automatically by operation of a separate shift control.

4. The improvement specified in claim 1, wherein said two gears are arranged to be engaged automatically when an automatic transmission control lever is moved to the parking position.

5. The improvement specified in claim 1, wherein the two simultaneously shiftable gears are adjacent gears of the second transmission input shaft.

6. The improvement specified in claim 1, wherein the two simultaneously shiftable gears are predetermined, and wherein they are the largest adjacent gears of the second transmission input shaft.

7. The improvement specified in claim 1, wherein the two simultaneously shiftable gears are selectable.

8. The improvement specified in claim 1, wherein a sensor is provided for determining a load of the simultaneously shiftable gears.

9. The improvement specified in claim 1, wherein a safety lock is provided to prevent the two simultaneously shiftable gears from being engaged when the motor vehicle is moving, and in that the safety lock is arranged to be releasable when the motor vehicle is stationary.

10. Method for controlling an automated double clutch transmission having a first transmission input shaft connected to a starting gear and a second input shaft connected to at least two gears and being devoid of connections to a starting gear, comprising simultaneously engaging two gears of the second input shaft to provide a parking lock function.

11. Method in accordance with claim 10, wherein for deactivation of the parking lock, the load on the simultaneously engaged gears is first determined, and wherein the gears are disengaged only if a relatively small load is present.

12. Method in accordance with claim 11, wherein when a relatively large load is detected, the direction of load is determined, and wherein a starting gear opposite to the direction of load is engaged and an associated clutch is engaged until the load is relatively small, whereupon the gears can be disengaged in a largely force-free manner.

13. Method in accordance with claim 10, wherein when the parking lock is to be activated, a determination is made as to whether the vehicle is moving or stationary, and in that, when the vehicle is moving, activation of the parking lock is prevented, and when the vehicle is stationary, activation is permitted.

14. Method in accordance with claim 13, wherein for deactivation of the parking lock, the load on the simultaneously engaged gears is first determined, and wherein the gears are disengaged only if a relatively small load is present.

15. Method in accordance with claim 14, wherein when a relatively large load is detected, the direction of load is determined, and wherein a starting gear opposite to the direction of load is engaged and an associated clutch is engaged until the load is relatively small, whereupon the gears can be disengaged in a largely force-free manner.

* * * * *